May 14, 1968 J. L. BLOOM 3,382,674
MECHANISMS FOR CONTROLLING SPEED RESPONSIVE GOVERNORS
Filed Dec. 1, 1966 2 Sheets-Sheet 2

United States Patent Office 3,382,674
Patented May 14, 1968

3,382,674
MECHANISMS FOR CONTROLLING SPEED
RESPONSIVE GOVERNORS
Joseph Lewis Bloom, Kings Heath, Birmingham, England,
assignor to Joseph Lucas (Industries) Limited
Filed Dec. 1, 1966, Ser. No. 598,421
3 Claims. (Cl. 60—39.28)

This invention relates to mechanisms for controlling the actuation of speed responsive governors and has for its object to provide such a mechanism in a simple and convenient form.

In accordance with the present invention a mechanism for controlling the actuation of a speed responsive governor comprises a first lever which is angularly movable by the governor in response to the changes in its driven speed, said first lever having thereon a cam surface, a second lever having a cam surface spaced from but presented towards said first mentioned cam surface, means responsive to changes in a predetermined parameter for varying the position of the second lever in a direction so that its cam surface is moved towards or away from the cam surface on the first lever, a member which can be moved angularly, and a spring movable with said member and acting between the cam surfaces on the first and second levers respectively, angular movement of the member and spring varying the moment of the spring force action on the first lever and therefore enabling the governor to vary the force which it exerts on the first lever to balance said spring force.

Figure 1:
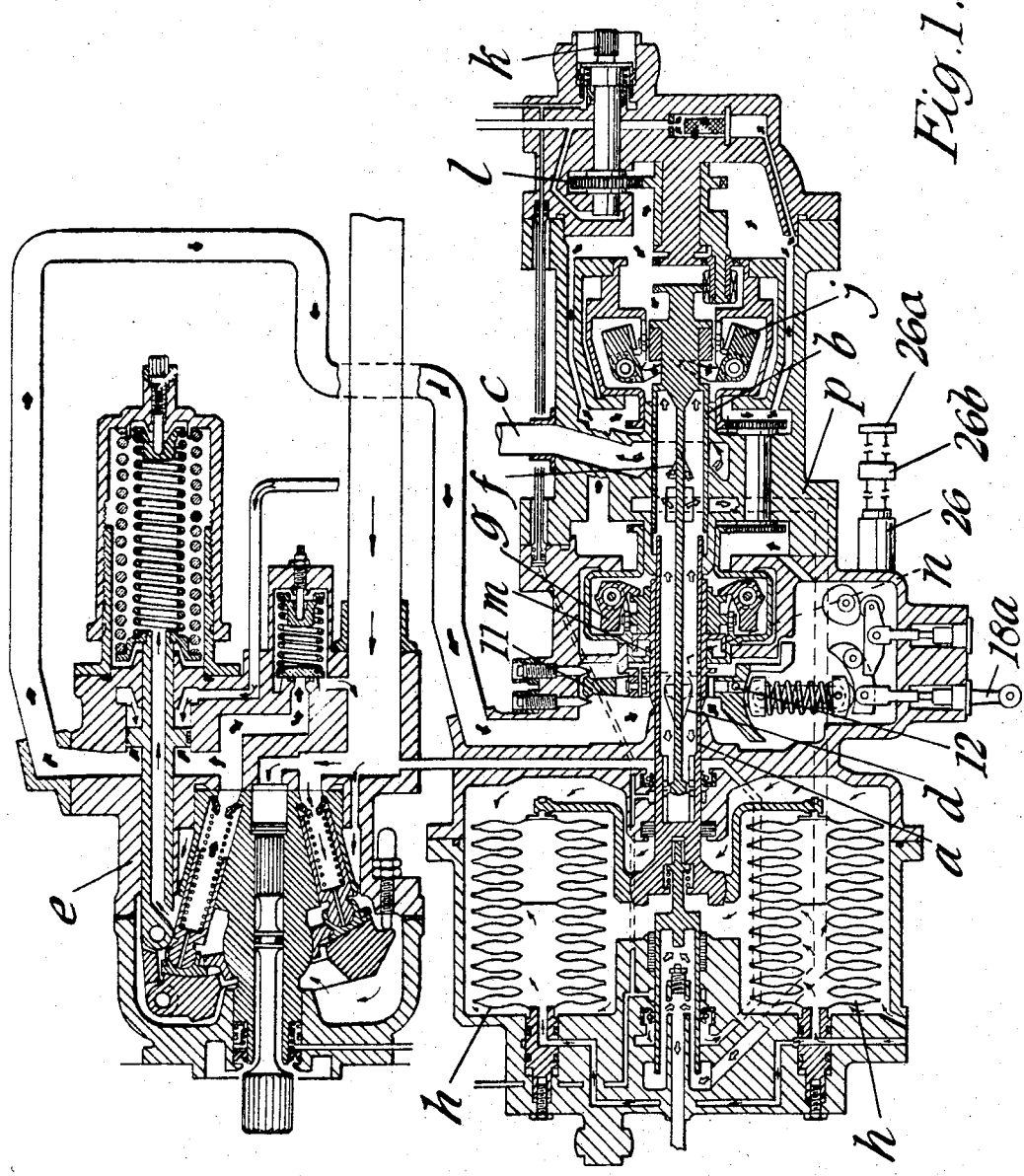
Figure 2:
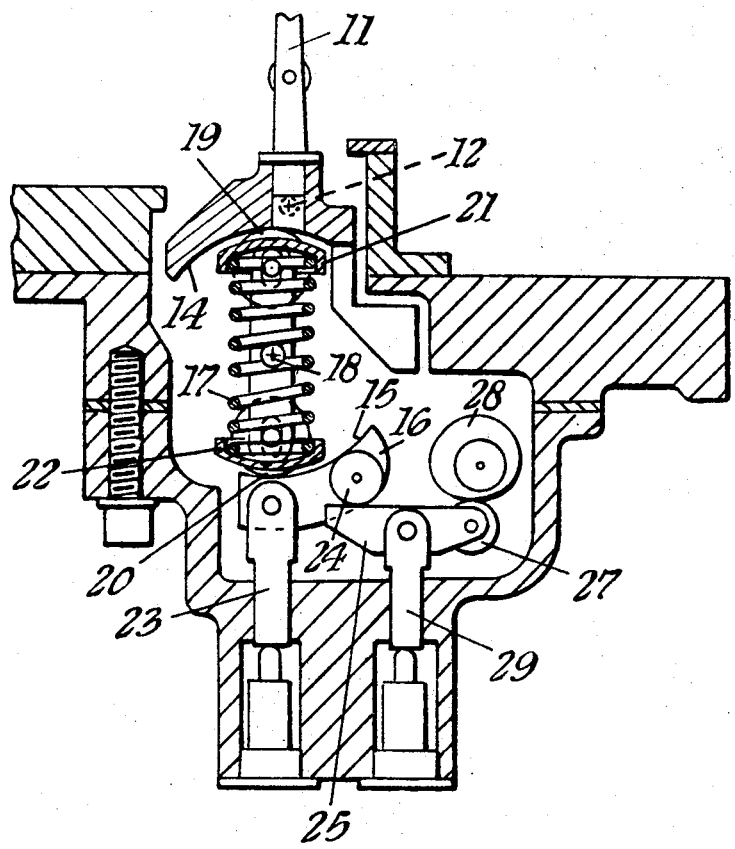

The invention will now be described by way of example with reference to the accompanying drawings in which:

FIGURE 1 is a view of part of a fuel system for a gas turbine engine and incorporating the invention and FIGURE 2 is a cross-sectional view of a portion of the system.

In the example illustrated there is provided a fuel supply system for a gas turbine engine and including a pair of co-axially movable and apertured sleeves $a$, $b$, the axial positions of which determine the flow of fuel which can reach the engine, with which the system is associated, through an outlet passage $c$, the fuel reaching the interior of the sleeves $a$, $b$ through a set of openings $d$ in the sleeve $a$ from an engine driven pump $e$ and leaving it through a set of openings $f$ in the other sleeve $b$. Axial positioning of the sleeves $a$, $b$ is determined in accordance with engine speed, and with pressures derived from the compressor stage of the engine, the former being applied to the sleeve $a$ by a set of rotatable weights $g$ and the latter being applied through a capsule assembly $h$. There is also a second set of weights $j$ applied to the sleeve $b$, these weights $j$ being rotated, as are the sleeves $a$, $b$ and the weights $g$ by the engine, through a shaft $k$ and gearing $l$. The system thus far described is substantially conventional. The response of the governor weights $g$ upon the flow of fuel through the openings $d$ in the sleeve $a$ is however modified through mechanism forming the subject of this invention, this mechanism being arranged to apply a force through a lever 11 which acts upon an outer sleeve $m$ at $n$ and is pivotally mounted at 12 on fixed structure $p$ of the apparatus. The position of the outer sleeve $m$, in turn determines the sizes of the openings $d$ available for flow of fuel therethrough.

The mechanism illustrated on an enlarged scale in FIGURE 2 includes means whereby the governor setting can be adjusted by an operator and further means are provided whereby the operator setting can be modified in accordance with temperature changes. In this instance the temperature changes are those in the jet pipe or exhaust of the engine, the system of this example being for use on an aircraft.

The governor applies a force to the lever 11 which is pivotally mounted at 12, the lever 11 being provided with an arcuate cam surface 14 on an arm extending laterally of the arm thereof against which the governor exerts its force.

A normally substantially concentric cam surface 15 is formed on a second lever 16, the cam surfaces 14, 15 being substantially diametrically opposite to one another and are disposed about the axis of an angularly movable member 18 which is movable by a pilot, in the case of a fuel system for an aircraft engine through a lever 18a.

The member 18 carries a diametrically arranged compression spring 17 bearing at its ends on the cam surfaces 14, 15 through rollers 19, 20 respectively carried in shoes 21, 22 formed on the member 18. The second lever 16 is pivotally mounted on an adjustable rod 23 on the support structure $p$, the second lever carrying at a position spaced from the connection with the rod 23, a roller 24 bearing upon one end of an arm 25. This arm 25 is pivotally mounted intermediate its ends on a further adjustable rod 29, the opposite end of the arm 25 remote from the roller 24 carrying a roller 27 engageable by a cam 28. The cam 28 is angularly movable by means of a motor or other mechanism indicated at 26 which receives a signal, from a device 26a through an amplifier 26b; responsive to changes in a parameter which in this case is jet pipe temperature in the engine. Except when in the position shown, the adjustment of the rod 29 and thus the arm 25 is capable of changing the force exerted by the spring 17 upon the first lever 11, this adjustment being available for pre-setting the governor response.

In the position of the mechanism shown, the roller 19 is disposed on the cam surface 14 in such a position that the spring 17 will exert a small force in opposition to the force exerted by the governor, this force being adjustable by means of the rod 23 and corresponding to a force required to maintain the engine fuel supply at a value for an idling speed. It will be noticed that the roller 20 bears on the cam surface 15 of the second lever 16 in a position coincident with the axis of the rod 23 so that any movement of the lever 16 in response to changes in the position of the arm 25 has substantially no effect upon the force exerted by the spring 17.

Should the pilot wish to increase engine speed, the member 18 is moved angularly in an anti-clockwise direction as seen in the drawings, thus increasing the force of the spring on the first lever 11. This enables the governor to move to increase fuel supply to the engine, in a manner not show, until the force exerted by the spring 17 is balanced by a new governor force, whereupon the lever 11 is restored to its initial position.

Any change in the temperature in the jet pipe causes angular movement of the cam 28 with a consequential change in the position of the lever 16. This changes the force exerted by the spring 17 to provide for a change in the governor force, as described, the effect of this being dependent upon the angular position of the member 18 and thus of the spring 17.

It is to be realised that movements are small and the cam surfaces 14, 15 are seldom out of their concentric arrangements to any substantial extent, this being desirable in reducing frictional resistance to angular movement of the member 18 to a minimum.

Having thus described my invention what I claim as new and desire to secure by Letters Patent is:

1. A mechanism for controlling the actuation of a speed responsive governor comprising a first lever which is angularly movable by the governor in response to the changes in its driven speed, said first lever having thereon a cam surface, a second lever having a cam surface spaced from but presented towards said first mentioned cam surface, means responsive to changes in a predetermined parameter for varying the position of the second lever in a direction so that its cam surface is moved towards or away from the cam surface on the first lever, a member which can be moved angularly and a spring movable with said member and acting between the cam surface on the first and second levers respectively, angular movement of the member and spring varying the moment of the spring force action on the first lever and therefore enabling the governor to vary the force which it exerts on the first lever to balance said spring force.

2. A mechanism as claimed in claim 1 in which the means responsive to said predetermined parameter is a device which provides a signal to be applied to the second lever in response to changes in temperature conditions obtaining in associated aparatus.

3. A fuel system for a gas turbine engine comprising a pump for supplying fuel to the engine, a fuel flow metering device disposed between the pump and the engine, an engine speed responsive governor arranged to control the flow metering device, and a mechanism for controlling the actuation of the speed responsive governor, said mechanism comprising a first lever which is angularly movable by the governor in response to the changes in its driven speed, said first lever having thereon a cam surface, a second lever having a cam surface spaced from but presented towards said first mentioned cam surface, means responsive to changes in a predetermined parameter for varying the position of the second lever in a direction so that its cam surface is moved towards or away from the cam surface on the first lever, a member which can be moved angularly, and a spring movable with said member and acting between the cam surfaces on the first and second levers respectively, angular movement of the member and spring varying the moment of the spring force action on the first lever and therefore enabling the governor to vary the force which it exerts on the first lever to balance said spring force.

No references cited.

JULIUS E. WEST, *Primary Examiner.*